(12) United States Patent
Gröger

(10) Patent No.: US 6,640,645 B2
(45) Date of Patent: Nov. 4, 2003

(54) ELECTRONIC CONTROL APPARATUS

(75) Inventor: Jens Gröger, Hannover (DE)

(73) Assignee: WABCO GmbH & Co. OHG, Hannover (DE)

( * ) Notice: Subject to any disclaimer, the term of this patent is extended or adjusted under 35 U.S.C. 154(b) by 3 days.

(21) Appl. No.: 09/841,549

(22) Filed: Apr. 23, 2001

(65) Prior Publication Data

US 2001/0049965 A1 Dec. 13, 2001

(30) Foreign Application Priority Data

Jun. 5, 2000 (DE) .......................... 100 22 124

(51) Int. Cl.⁷ ................................................ G01L 9/00
(52) U.S. Cl. ............................ 73/753; 73/715; 73/756
(58) Field of Search .................... 73/715, 756, 753

(56) References Cited

U.S. PATENT DOCUMENTS

| | | |
|---|---|---|
| 5,648,615 A | 7/1997 | Jeske et al. |
| 5,852,320 A | 12/1998 | Ichihashi |
| 5,948,989 A * | 9/1999 | Ichikawa et al. ............. 73/708 |
| 6,155,119 A * | 12/2000 | Normann et al. ............. 73/756 |
| 6,311,561 B1 * | 11/2001 | Bang et al. ................... 73/708 |

FOREIGN PATENT DOCUMENTS

| | | |
|---|---|---|
| DE | 4334123 | 4/1995 |
| DE | 29602711 | 5/1996 |
| DE | 19605795 | 8/1997 |
| DE | 19707503 | 8/1998 |
| JP | 08210935 | 8/1996 |
| JP | 10332505 | 12/1998 |

* cited by examiner

Primary Examiner—Edward Lefkowitz
Assistant Examiner—Jermaine Jenkins
(74) Attorney, Agent, or Firm—Proskauer Rose LLP

(57) ABSTRACT

An electronic control apparatus contained within a housing comprises a printed circuit board with both electronic components and at least one pressure sensor. A pressure conduit is used to channel a pressure medium to be measured to the pressure sensor. The perimeter edge of the pressure conduit facing the pressure sensor is hermetically sealed around the pressure sensor, so that the other components on the printed circuit board, as well as the housing itself, are not subjected to the pressure medium to be measured.

16 Claims, 1 Drawing Sheet

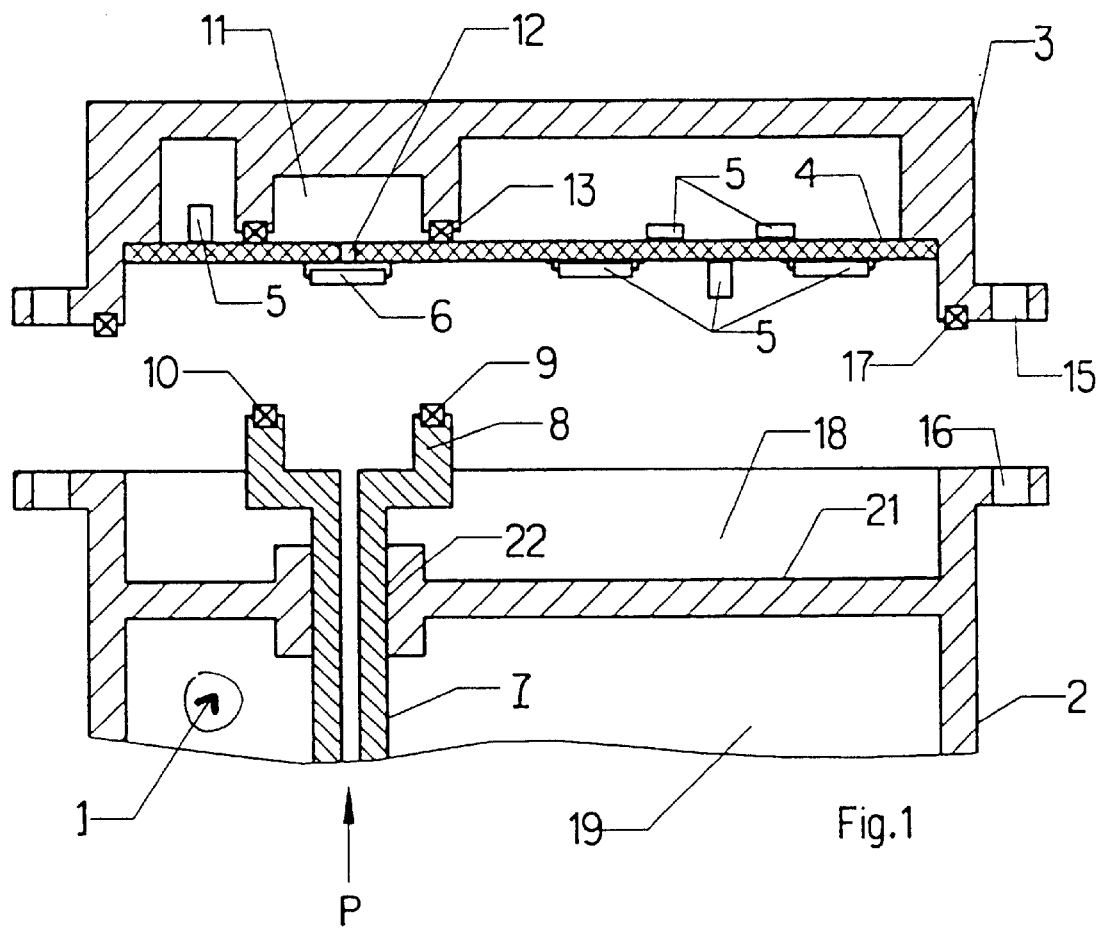
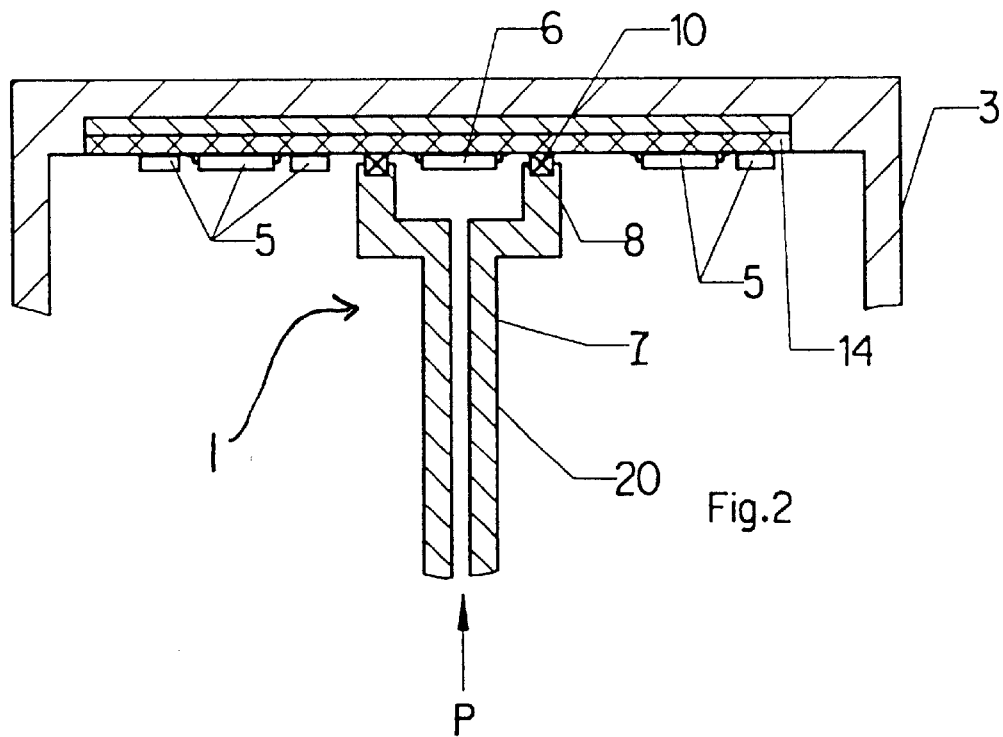

ELECTRONIC CONTROL APPARATUS

BACKGROUND OF THE INVENTION

The present invention relates to an electronic control apparatus, which includes both electrical and mechanical components. More specifically, the present invention relates to a control apparatus that includes a pressure medium control function, in addition to electronic control functions.

This type of control apparatus typically comprises a printed circuit board enclosed within a housing. The housing material can be either metal (usually aluminum) or plastic. The printed circuit board can be either one-sided or two-sided; i.e., with electronic components on one or both sides. These components may be wired using pass-through technology, or may be surface mounted (SMD) components that are soldered directly to the printed circuit board.

The type of electronic control apparatus which also includes a mechanical function is known as "mechatronic." This apparatus type processes both electrical and mechanical input parameters. A typical mechanical input parameter would be in the form of a pressure medium, such as compressed air.

As disclosed in German patent document DE 29 602 711 U1, which is incorporated herein by reference, a printed circuit board can include one or several pressure sensors, in addition to various electronic components.

This known type of pressure sensor is configured as an SMD component in the form of an IC. A typical configuration would consist of a block-shaped plastic housing with leads, within which a semiconductor pressure sensor is included. The pressure sensor housing would also include a bore-shaped opening, for the intake of the pressure medium. As such, the pressure sensor housing, and its associated electronic components, are subjected to the same pressure medium as is directed to the pressure sensor. Therefore, those applications requiring higher levels of a pressure medium to be measured would necessitate the use of higher strength housing walls, in addition to a pressure-sealed housing cover. Moreover, the electronic components within the housing would also have to be designed to withstand the higher pressures.

Accordingly, it is an object of the present invention to disclose a mechatronic type of control apparatus, where an IC pressure sensor is installed on a printed circuit board, without requiring the overall housing, as well as the electronic components mounted on the printed circuit board, to be subjected to the pressure medium level applied to the pressure sensor.

SUMMARY OF THE INVENTION

This object is attained by means of an electronic control apparatus having both electrical and mechanical functions, including the pressure measurement of a pressure medium. The inventive control apparatus is comprised of a housing and a cover, with one or more printed circuit boards attached to the interior side of the cover. Electronic and mechanical components can be mounted on one or both sides of the printed circuit board(s), including at least one pressure sensor mounted on the interior side of a printed circuit board. A pressure conduit, mounted within the housing, receives a pressure medium to be measured at one open end, and channels this pressure medium to the pressure sensor through its other open end. This other open end of the pressure conduit encloses the pressure sensor within a pressure tight seal against the printed circuit board, so that the other components on the printed circuit board, as well as the overall housing, are isolated from the pressure medium to be measured.

In one preferred embodiment of the present invention, a pressure equalization chamber, having the same cross-sectional surface area as the aforementioned other open end of the pressure conduit, is attached to the printed circuit board, directly opposite the other open end of the pressure conduit on the other side of the printed circuit board. A bore through the printed circuit board enables the pressure medium to enter the pressure equalization chamber, thus equalizing the pressure on both sides of the printed circuit board, to avoid stressing the board when the pressure medium is applied.

Another preferred embodiment utilizes a heat sink type of printed circuit board mounted directly to the interior surface of the cover, thus providing rigidity to the heat sink board for withstanding the applied pressure medium.

BRIEF DESCRIPTION OF THE DRAWINGS

The invention is described in greater detail below through the example of embodiments shown in the drawings, wherein FIG. 1 shows one embodiment of an electronic control apparatus housing and cover, containing a pressure sensor mounted on an electronic printed circuit board.

FIG. 2 shows the housing cover only of another embodiment of an electronic control apparatus with a heat sink printed circuit board attached to the housing cover.

DETAILED DESCRIPTION OF PREFERRED EMBODIMENTS OF THE INVENTION

FIG. 1 shows an electronic control apparatus 1 comprising a housing 2 and a cover 3. The cover 3 can be screwed onto the housing 2 by means of brackets 15, 16, where the bracket 16 contains a threaded bore. When the housing 2 and the cover 3 are screwed together, a pressure seal 17 serves to protect the housing interior 18 from atmospheric pollution.

The housing 2 and the cover 3 material can be either metal (steel or aluminum) or plastic.

The housing 2 has an additional interior area 19, in which, e.g., a valve arrangement (not shown) can be located. The interior areas 18, 19 are separated from each other pressure-tight by a housing element 21.

The cover 3 encloses a printed circuit board 4 of conventional design, which contains various electronic components 5. The printed circuit board 4 can be constructed in several layers. The electronic components 5 can be of conventional design, can be designed with pass-through wiring, or can be in the form of SMD components. The printed circuit board 4 can also be imprinted on both sides.

In addition to the aforementioned components 5, the printed circuit board 4 contains a pressure sensor 6, which can be designed as a conventional component, or in the form of an SMD component.

When housing 2 and cover 3 are attached to each other, a pressure conduit 7, which is glued into a bore 22 of the housing element 21, serves as a pressure intake channel for the pressure sensor 6. The pressure conduit 7 consists of a tubular lower part 20 and a pot-shaped upper part 8.

The upper part 8 of the pressure conduit 7 includes an edge 9, which in the attached state of housing and cover encloses the pressure sensor 6, and is sealed to printed circuit board 4 by means of a sealing ring 10.

A pressure medium P is supplied to the pressure sensor 6 through the tubular lower part 20 of the pressure conduit 7. The pressure medium P to be measured is typically connected to a pressure chamber, such as a valve (not shown) built into the lower housing part 19.

In order to achieve a good seal between the sealing ring 10 and the printed circuit board 4, the copper coating of the printed circuit board 4 opposite the sealing ring 10 can be left in place. In this case, the printed circuit board 4 must be constructed in several layers, and the electrical connections for the pressure sensor 6 must be made via printed circuits inside the printed circuit board 4.

Importantly, a pressure equalization chamber 11 is configured on the opposite side of the printed circuit board 4 in relationship to the pressure conduit 7. This pressure equalization chamber 11 has the same cross-sectional surface area as the upper part 8 of the pressure conduit 7. A pressure equalization bore 12, penetrating the printed circuit board 4 at the location of the pressure sensor 6, enables the aeration of the pressure equalization chamber 11.

The pressure equalization bore 12 can be metallized throughout, in order to increase its pressure-resistant characteristics. That is, the wall of the pressure equalization bore 12 is coated with metal, or soldering tin. This coating prevents the pressure medium P from entering into the printed circuit board 4.

The pressure equalization chamber 11 is pressure sealed against the printed circuit board 4 by an additional sealing ring 13.

The function of the pressure equalization chamber 11 and the bore 12 is to maintain the same pressure on both sides of the printed circuit board 4, so that bending will not occur when the pressure medium P is applied through pressure conduit 7.

The cross-section of the upper part 8 of the pressure conduit 7 can be either round or angular. The cross-sectional surface area depends on the size of the pressure sensor 6. A typical value of the diameter of upper part 8 is 1 cm. A typical maximum applied pressure P is approximately 10 to 12 bar.

As an alternative to using the sealing ring 13, the pressure equalization chamber 11 may be pressure-sealed by means of pressure-proof glue. This design would be less costly, due to the elimination of the additional sealing ring 13.

The upper part 8 of the pressure conduit 7 protrudes sufficiently from the housing 2 to ensure a reliable seal between the pressure conduit 7 and the printed circuit board 4, when the sealing ring 10 is compressed by attaching the cover 3 to the housing 2.

FIG. 2 shows only the cover 3 of another embodiment of the electronic control apparatus 1, where a different type of printed circuit board 14 is attached by glue directly to the cover 3. The printed circuit board 14 is configured as a printed heat sink board, which means that its back side is pressure-sealed by means of a heart dissipating aluminum sheet of approximately 1 mm thickness. In this configuration, the electronic components 5 can only be soldered on the front side of the printed circuit board 14, and are in the form of SMD components.

Since the printed heat sink board 14, in combination with the cover 3, has a very high resistance to bending, no pressure equalization chamber 11 need be provided in this embodiment.

As described above, the pressure conduit 7 can be attached to the housing element 21. Alternatively, it can also be attached by its lower part 20 to a lateral wall, or to the frame of the housing 2. Illustratively, if the housing 2 is made of plastic, the pressure conduit 7 can be attached by its lower part 20 to the frame of the housing 2 by means of an extrusion coating.

The inside area 18 of the housing 2 (FIG. 1) is vented to the outside atmosphere, e.g., by means of a bore (not shown). This venting action prevents the formation of condensation water in the housing 2, and also maintains atmospheric pressure within area 18. As such, a rise in pressure within area 18, due to a slight permeability between the sealing ring 10 and the printed circuit board 4 (or 14), is prevented.

In short, the present invention enables the implementation of various embodiments of a mechatronic type of control apparatus, using conventional pressure sensors and electronic components. Thus, the pressure sensors can be utilized in the form of SMD components or IC's, as opposed to the use of complex and expensive hybrid pressure sensors. Moreover, by sealing the pressure conduit 7 directly to the printed circuit board 4 (or 14), the inventive configuration is not affected by lateral offsets, or tolerances, between the housing 2 and the cover 3.

While the invention has been described by reference to specific embodiments, this was for purposes of illustration only and should not be construed to limit the scope of the invention. Numerous alternative embodiments will be apparent to those skilled in the art.

What is claimed is:

1. An electronic control apparatus having both electrical and mechanical functions, including the measurement of a pressure medium, comprising:
   a) a housing,
   b) a cover for said housing,
   c) at least one printed circuit board attached to the interior side of said cover, said at least one printed circuit board having a first side facing the interior of said housing, and a second side, opposite to said first side, facing said interior side of said cover,
   d) electronic components mounted on said first and second sides of said at least one printed circuit board,
   e) at least one pressure sensor and at least one other electronic component mounted on said first side of said at least one printed circuit board,
   f) a pressure conduit, mounted within said housing, having a first open end for receiving said pressure medium to be measured,
   g) said pressure conduit having a second open end for channeling said pressure medium to said at least one pressure sensor,
   wherein said pressure conduit encloses said at least one pressure sensor within said second open end in a pressure tight seal against said first side of said at least one printed circuit board thereby to form a pressure tight chamber on said first side of said at least one printed circuit board which separates said at least one pressure sensor from said at least one other electronic component.

2. The electronic control apparatus of claim 1, wherein said second open end of said pressure conduit contains a first sealing ring for making said pressure tight seal against said first side of said at least one printed circuit board.

3. The electronic control apparatus of claim 2, wherein said at least one printed circuit board includes a copper coating on said first side where said first sealing ring contacts said first side of said at least one printed circuit board.

4. The electronic control apparatus of claim 3, wherein said at least one printed circuit board is configured in layers, and wherein electrical connections of said pressure sensor are made with strip conductors within said at least one printed circuit board.

5. The electronic control apparatus of claim 1, wherein a pressure equalization chamber, having the same cross-sectional surface area as said second open end of said pressure conduit, is formed within said cover on said second side of said at least one printed circuit board, directly opposite said second open end of said pressure conduit, which is on said first side of said at least one printed circuit board.

6. The electronic control apparatus of claim 5, wherein said at least one printed circuit board contains a pressure equalization bore adjacent to said second open end of said pressure conduit, said pressure equalization leading into said pressure equalization chamber.

7. The electronic control apparatus of claim 6, wherein said pressure equalization bore is coated with metal.

8. The electronic control apparatus of claim 5, wherein said pressure equalization chamber is pressure sealed against said second side of said at least one printed circuit board by a second sealing ring.

9. The electronic control apparatus of claim 5, wherein said pressure equalization chamber is pressure sealed against said second side of said at least one printed circuit board by a pressure-proof glue.

10. The electronic control apparatus of claim 1, wherein said at least one printed circuit board contains both plug-in components and SMD components.

11. The electronic control apparatus of claim 1, wherein said at least one printed circuit board is configured as a heat sink board, having only SMD components mounted on said first side facing the interior of said housing.

12. The electronic control apparatus of claim 11, wherein said heat sink board is attached to the inside of said cover by glue.

13. The electronic control apparatus of claim 1, wherein said pressure conduit is directly attached to said housing.

14. The electronic control apparatus of claim 13, wherein said pressure conduit is glued into a bore of said housing.

15. The electronic control apparatus of claim 13, wherein said pressure conduit is attached to a sidewall of said housing by extrusion coating.

16. The electronic control apparatus of claim 1, wherein said cover is attached to said housing by screws.

* * * * *